(12) United States Patent
Baruch et al.

(10) Patent No.: US 10,235,090 B1
(45) Date of Patent: Mar. 19, 2019

(54) VALIDATING REPLICATION COPY CONSISTENCY USING A HASH FUNCTION IN A STORAGE SYSTEM

(71) Applicant: EMC IP Holding Company, LLC, Hopkinton, MA (US)

(72) Inventors: Leehod Baruch, Rishon Leziyon (IL); Assaf Natanzon, Tel Aviv (IL); Jehuda Shemer, Kfar Saba (IL); Amit Lieberman, Raanana (IL); Ron Bigman, Holon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 3 days.

(21) Appl. No.: 15/274,117

(22) Filed: Sep. 23, 2016

(51) Int. Cl.
    *G06F 3/06* (2006.01)
(52) U.S. Cl.
    CPC .......... *G06F 3/065* (2013.01); *G06F 3/0619* (2013.01); *G06F 3/0683* (2013.01)
(58) Field of Classification Search
    None
    See application file for complete search history.

(56) References Cited

U.S. PATENT DOCUMENTS

| | | | |
|---|---|---|---|
| 5,170,480 A | 12/1992 | Mohan et al. | |
| 5,249,053 A | 9/1993 | Jain | |
| 5,388,254 A | 2/1995 | Betz et al. | |
| 5,499,367 A | 3/1996 | Bamford et al. | |
| 5,526,397 A | 6/1996 | Lohman | |
| 5,734,815 A * | 3/1998 | Schatzberg | G06F 11/1008 714/5.11 |
| 5,864,837 A | 1/1999 | Maimone | |
| 5,879,459 A | 3/1999 | Gadgil et al. | |
| 5,990,899 A | 11/1999 | Whitten | |
| 6,042,652 A | 3/2000 | Hyun et al. | |
| 6,065,018 A | 5/2000 | Beier et al. | |
| 6,143,659 A | 11/2000 | Leem | |
| 6,148,340 A | 11/2000 | Bittinger et al. | |
| 6,174,377 B1 | 1/2001 | Doering et al. | |
| 6,174,809 B1 | 1/2001 | Kang et al. | |
| 6,203,613 B1 | 3/2001 | Gates et al. | |
| 6,260,125 B1 | 7/2001 | McDowell | |
| 6,270,572 B1 | 8/2001 | Kim et al. | |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

U.S. Appl. No. 15/274,362, filed Sep. 23, 2016, Baruch et al.

(Continued)

*Primary Examiner* — Tuan V Thai
(74) *Attorney, Agent, or Firm* — Daly, Crowley, Mofford & Durkee, LLP

(57) ABSTRACT

Described embodiments provide systems and methods for operating a storage system. One or more data replicas of production data of the storage system are generated. For each of the one or more data replicas, an associated hash value is generated. The one or more data replicas are stored in a replica storage of the storage system, and the associated hash values are stored as journal data associated with the respective data replica. Each data replica is verified based upon the hash value retrieved from the journal data.

18 Claims, 7 Drawing Sheets

(56) References Cited

U.S. PATENT DOCUMENTS

| | | |
|---|---|---|
| 6,272,534 B1 | 8/2001 | Guha |
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |
| 6,804,676 B1 | 10/2004 | Bains, II |
| 6,947,981 B2 | 9/2005 | Lubbers et al. |
| 7,043,610 B2 | 5/2006 | Horn et al. |
| 7,051,126 B1 | 5/2006 | Franklin |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,519,625 B2 | 4/2009 | Honami et al. |
| 7,519,628 B1 | 4/2009 | Leverett |
| 7,546,485 B2 | 6/2009 | Cochran et al. |
| 7,590,887 B2 | 9/2009 | Kano |
| 7,606,940 B2 | 10/2009 | Yamagami |
| 7,719,443 B1 | 5/2010 | Natanzon |
| 7,757,057 B2 | 7/2010 | Sangapu et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,205,009 B2 | 6/2012 | Heller et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natenzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1* | 7/2013 | Natanzon ............ G06F 11/1453 711/133 |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1* | 4/2015 | Natanzon ............ G06F 9/46 707/634 |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |

(56) References Cited

U.S. PATENT DOCUMENTS

| | | |
|---|---|---|
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 2002/0129168 A1 | 9/2002 | Kanai et al. |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0145317 A1 | 7/2003 | Chamberlain |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0181810 A1 | 7/2006 | Bao |
| 2006/0179343 A1 | 8/2006 | Kitamura |
| 2006/0195670 A1 | 8/2006 | Iwamura et al. |
| 2007/0055833 A1 | 3/2007 | Vu et al. |
| 2007/0180304 A1 | 8/2007 | Kano |
| 2007/0198602 A1 | 8/2007 | Ngo et al. |
| 2007/0198791 A1 | 8/2007 | Iwamura et al. |

OTHER PUBLICATIONS

U.S. Appl. No. 15/274,122, filed Sep. 23, 2016, Baruch et al.
U.S. Appl. No. 15/274,373, filed Sep. 23, 2016, Baruch et al.
U.S. Appl. No. 15/274,129, filed Sep. 23, 2016, Baruch et al.
U.S. Appl. No. 15/274,381, filed Sep. 23, 2016, Ayzenberg et al.
U.S. Appl. No. 15/275,677, filed Sep. 23, 2016, Baruch et al.
Gibson, "Five Point Plan Lies at the Heart of Compression Technology;" Tech Talk; Apr. 29, 1991; 1 Page.
Soules et al., "Metadata Efficiency in Versioning File Systems;"$2^{nd}$ USENIX Conference on File and Storage Technologies; Mar. 31, 2003-Apr. 2, 2003; 16 Pages.
AIX System Management Concepts: Operating Systems and Devices; Bull Electronics Angers; May 2000; 280 Pages.
Soules et al, "Metadata Efficiency in a Comprehensive Versioning File System;" May 2002; CMU-CS-02-145; School of Computer Science, Carnegie Mellon University; 33 Pages.
"Linux Filesystems," Sams Publishing; 2002; Chapter 1: Introduction to Filesystems pp. 17-22 and Chapter 3: Overview of Journaling Filesystems pp. 67-71; 12 Pages.
Bunyan et al., "Multiplexing in a BrightStor® ARCserve® Backup Release 11;" Mar. 2004; 4 Pages.
Marks, "Network Computing, 33;" Cover Story; Feb. 2, 2006; 8 Pages.
Hill, "Network Computing, NA;" Cover Story; Jun. 8, 2006; 9 Pages.
Microsoft Computer Dictionary, Fifth Edition; 2002; 3 Pages.
Wikipedia; Retrieved on Mar. 29, 2011 from http://en.wikipedia.org/wiki/DEFLATE: DEFLATE; 6 Pages.
Wikipedia; Retrieved on Mar. 29, 2011 from http://en.wikipedla.org/wiki/Huffman_coding: Huffman Coding; 11 Pages.
Wikipedia; Retrieved on Mar. 29, 2011 from http:///en.wikipedia.org/wiki/LZ77: LZ77 and LZ78; 2 Pages.

* cited by examiner

US 10,235,090 B1

VALIDATING REPLICATION COPY CONSISTENCY USING A HASH FUNCTION IN A STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. A distributed storage system may include data protection systems that back up production site data by replicating production site data on a secondary backup storage system. The production site data may be replicated on a periodic basis and/or may be replicated as changes are made to the production site data. The backup storage system may be situated in the same physical location as the production storage system, or in a physically remote location

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect provides a method of operating a storage system. One or more data replicas of production data of the storage system are generated. For each of the one or more data replicas, an associated hash value is generated. The one or more data replicas are stored in a replica storage of the storage system, and the associated hash values are stored as journal data associated with the respective data replica. Each data replica is verified based upon the hash value retrieved from the journal data.

Another aspect provides a system that includes a processor and memory storing computer program code that when executed on the processor causes the processor to operate a storage system. The storage system is operable to generate one or more data replicas of production data of the storage system. For each of the one or more data replicas, an associated hash value is generated. The one or more data replicas are stored in a replica storage of the storage system, and the associated hash values are stored as journal data associated with the respective data replica. Each data replica is verified based upon the hash value retrieved from the journal data.

Another aspect provides a computer program product including a non-transitory computer readable storage medium having computer program code encoded thereon that when executed on a processor of a computer causes the computer to operate a storage system. The computer program product includes computer program code for generating one or more data replicas of production data of the storage system. For each of the one or more data replicas, an associated hash value is generated. The one or more data replicas are stored in a replica storage of the storage system, and the associated hash values are stored as journal data associated with the respective data replica. Each data replica is verified based upon the hash value retrieved from the journal data.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or data write request. In some embodiments, the term "storage system" may encompass physical computing systems, cloud or virtual computing systems, or a combination thereof. In some embodiments, the term "storage device" may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN)). In some embodiments, the term "storage device" may also refer to a storage array including multiple storage devices.

Figure 1:
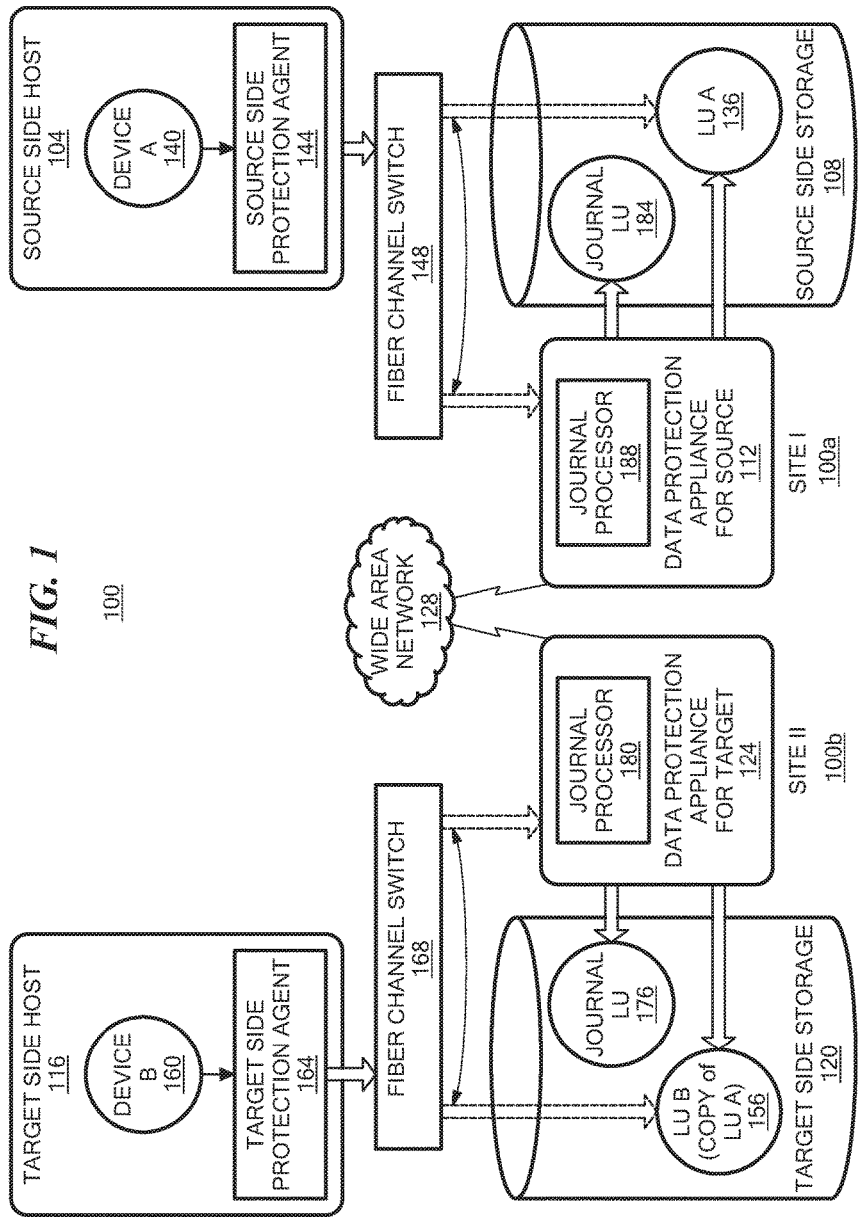
FIG. 1 is a block diagram of a data protection system, according to an illustrative embodiment of the instant disclosure.

Referring to the example embodiment shown in FIG. 1, a data protection system 100 may include two sites, Site I 100a and Site II 100b, which communicate via a wide area network (WAN) 128, such as the Internet. In some embodiments, under normal operation, Site I 100a may correspond to a source site (i.e., the transmitter within a data replication workflow) of system 100 and Site II 100b may be a target site (i.e., the receiver within a data replication workflow) of data protection system 100. Thus, in some embodiments, during normal operations, the direction of replicated data flow may be from Site I 100a to Site II 100b.

In certain embodiments, Site I 100a and Site II 100b may be remote from one another. In other embodiments, Site I 100a and Site II 100b may be local to one another and may be connected via a local area network (LAN). In some embodiments, local data protection may have the advantage of minimizing data lag between target and source, and remote data protection may have the advantage of being robust in the event that a disaster occurs at the source site.

In particular embodiments, data protection system 100 may include a failover mode of operation, wherein the direction of replicated data flow is reversed. In particular, Site I 100a may behave as a target site and Site II 100b may behave as a source site. In some embodiments, failover may be triggered manually (e.g., by a user) or automatically. In many embodiments, failover may be performed in the event of a disaster at Site I 100a. In some embodiments, both Site I 100a and Site II 100b may behave as source site for some stored data and may behave simultaneously as a target site for other stored data. In certain embodiments, a portion of stored data may be replicated from one site to the other, and another portion may not be replicated.

In some embodiments, Site I 100a corresponds to a production site (e.g., a facility where one or more hosts run data processing applications that write data to a storage system and read data from the storage system) and Site II 100b corresponds to a backup or replica site (e.g., a facility where replicated production site data is stored). Thus, in some embodiments, Site II 100b may be responsible for replicating production site data and may enable rollback of data of Site I 100a to an earlier point in time. In some embodiments, rollback may be used in the event of data corruption of a disaster, or alternatively in order to view or to access data from an earlier point in time.

Some described embodiments of Site I 100a may include a source host 104, a source storage system (or "storage array") 108, and a source data protection appliance (DPA) 112 coupled via a first storage area network (SAN). Similarly, in some embodiments, Site II 100b may include a target host 116, a target storage system 120, and a target DPA 124 coupled via a second SAN. In some embodiments, each SAN may include one or more devices (or "nodes") that may be designated an "initiator," a "target", or both. For example, the first SAN may include a first fiber channel switch 148 and the second SAN may include a second fiber channel switch 168. In some embodiments, communication links between each host 104 and 116 and its corresponding storage system 108 and 120 may be any appropriate medium suitable for data transfer, such as fiber communication channel links. In some embodiments, a host communicates with its corresponding storage system over a communication link, such as an InfiniBand (IB) link or Fibre Channel (FC) link, and/or a network, such as an Ethernet or Internet (e.g., TCP/IP) network that may employ, for example, the iSCSI protocol.

In some embodiments, each storage system 108 and 120 may include storage devices for storing data, such as disks or arrays of disks. Typically, in such embodiments, storage systems 108 and 120 may be target nodes. In some embodiments, in order to enable initiators to send requests to storage system 108, storage system 108 may provide (e.g., expose) one or more logical units (LU) to which commands are issued. Thus, in some embodiments, storage systems 108 and 120 may be SAN entities that provide multiple logical units for access by multiple SAN initiators. In some embodiments, an LU is a logical entity provided by a storage system for accessing data stored therein. In some embodiments, a logical unit may be a physical logical unit or a virtual logical unit. In some embodiments, a logical unit may be identified by a unique logical unit number (LUN).

In the embodiment shown in FIG. 1, storage system 108 may expose logical unit 136, designated as LU A, and storage system 120 exposes logical unit 156, designated as LU B. LU B 156 may be used for replicating LU A 136. In such embodiments, LU B 156 may be generated as a copy of LU A 136. In one embodiment, LU B 156 may be configured so that its size is identical to the size of LU A 136.

As shown in FIG. 1, in some embodiments, source host 104 may generate a host device 140 ("Device A") corresponding to LU A 136 and source host 116 may generate a host device 160 ("Device B") corresponding to LU B 156. In some embodiments, a host device may be a logical entity within a host through which the host may access an LU. In some embodiments, an operating system of a host may generate a host device for each LU exposed by the storage system in the host SAN.

In some embodiments, source host 104 may act as a SAN initiator that issues I/O requests through host device 140 to LU A 136 using, for example, SCSI commands. In some embodiments, such requests may be transmitted to LU A 136 with an address that includes a specific device identifier, an offset within the device, and a data size.

In some embodiments, source DPA 112 and target DPA 124 may perform various data protection services, such as data replication of a storage system, and journaling of I/O requests issued by hosts 104 and/or 116. In some embodiments, when acting as a target DPA, a DPA may also enable rollback of data to an earlier point-in-time (PIT), and enable processing of rolled back data at the target site. In some embodiments, each DPA 112 and 124 may be a physical device, a virtual device, or may be a combination of a virtual and physical device.

In some embodiments, a DPA may be a cluster of such computers. In some embodiments, use of a cluster may ensure that if a DPA computer is down, then the DPA functionality switches over to another computer. In some embodiments, the DPA computers within a DPA cluster may communicate with one another using at least one communication link suitable for data transfer, for example, an InfiniBand (IB) link, a Fibre Channel (FC) link, and/or a network link, such as an Ethernet or Internet (e.g., TCP/IP) link to transfer data via fiber channel or IP based protocols, or other such transfer protocols. In some embodiments, one computer from the DPA cluster may serve as the DPA leader. In some embodiments, the DPA cluster leader may coordinate between the computers in the cluster, and may also perform other tasks that require coordination between the computers, such as load balancing.

In certain embodiments, a DPA may be a standalone device integrated within a SAN. Alternatively, a DPA may be integrated into storage system. In some embodiments, the DPAs communicate with their respective hosts through communication links suitable for data transfer, for example, an InfiniBand (IB) link, a Fibre Channel (FC) link, and/or a network link, such as an Ethernet or Internet (e.g., TCP/IP) link to transfer data via, for example, SCSI commands or any other protocol.

In various embodiments, the DPAs may act as initiators in the SAN. For example, the DPAs may issue I/O requests using, for example, SCSI commands, to access LUs on their respective storage systems. In some embodiments, each DPA may also be configured with the necessary functionality to act as targets, e.g., to reply to I/O requests, such as SCSI commands, issued by other initiators in the SAN, including their respective hosts. In some embodiments, being target nodes, the DPAs may dynamically expose or remove one or more LUs. In some embodiments, Site I 100a and Site II 100b may each behave simultaneously as a production site and a backup site for different logical units. As such, in some embodiments, DPA 112 and DPA 124 may each behave as a source DPA for some LUs and as a target DPA for other LUs, at the same time.

In the embodiment shown in FIG. 1, hosts 104 and 116 include protection agents 144 and 164, respectively. In some embodiments, protection agents 144 and 164 may be intercept commands (e.g., SCSI commands) issued by their respective hosts to LUs via host devices (e.g., host devices 140 and 160). In some embodiments, a protection agent may act on intercepted SCSI commands issued to a logical unit in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. In some embodiments, protection agents 144 and 164 may handle different SCSI commands, differently, according to the type of the command. For example, a SCSI command inquiring about the size of a certain LU may be sent directly to that LU, whereas a SCSI write command may be split and sent first to a DPA within the host's site.

In various embodiments, a protection agent may change its behavior for handling SCSI commands, for example as a result of an instruction received from the DPA. For example, the behavior of a protection agent for a certain host device may depend on the behavior of its associated DPA with respect to the LU of the host device. In some embodiments, when a DPA behaves as a source site DPA for a certain LU, then during normal course of operation, the associated protection agent may split I/O requests issued by a host to the host device corresponding to that LU. Similarly, in some embodiments, when a DPA behaves as a target device for a certain LU, then during normal course of operation, the associated protection agent fails I/O requests issued by host to the host device corresponding to that LU.

In some embodiments, communication between protection agents 144 and 164 and a respective DPA 112 and 124 may use any protocol suitable for data transfer within a SAN, such as fiber channel, SCSI over fiber channel, or other protocols. In some embodiments, the communication may be direct, or via a logical unit exposed by the DPA.

In certain embodiments, protection agents may be drivers located in their respective hosts. Alternatively, a protection agent may also be located in a fiber channel switch, or in any other device situated in a data path between a host and a storage system or on the storage system itself. In a virtualized environment, the protection agent may run at the hypervisor layer or in a virtual machine providing a virtualization layer.

Figure 2:
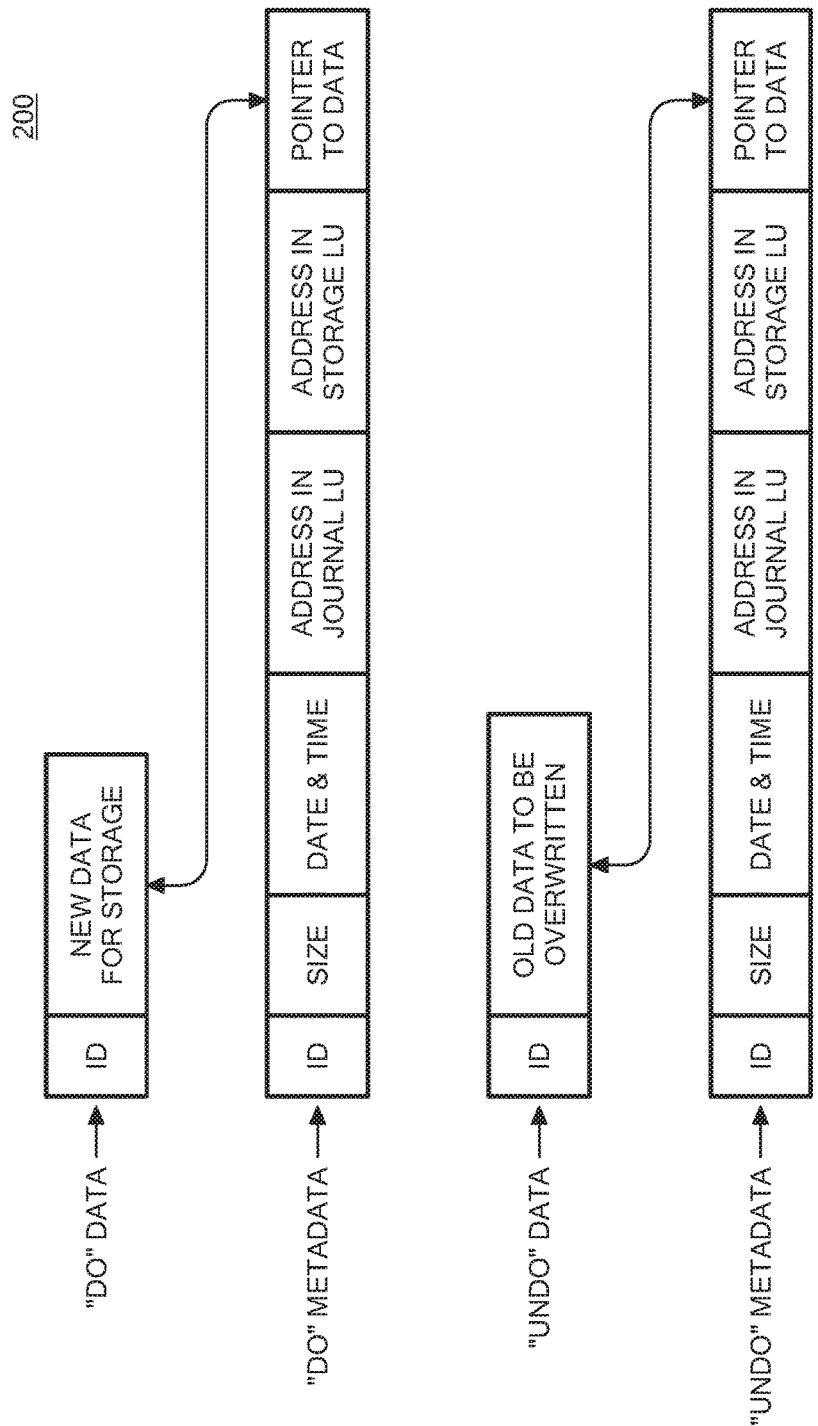
FIG. 2 is a diagram illustrating a journal history of write transactions for the data protection system of FIG. 1, according to an illustrative embodiment of the instant disclosure.

As shown in FIG. 1, in some embodiments, target storage system 120 may expose a journal LU 176 for maintaining a history of write transactions made to LU B 156, referred to herein as a "journal." In some embodiments, a journal may be used to provide access to storage at specified points-in-time (PITs), as discussed in greater detail in regard to FIG. 2. In some embodiments, the journal may be stored across multiple LUs (e.g., using striping, etc.). In some embodiments, target DPA 124 may include a journal processor 180 for managing the journal within journal LU 176. In some embodiments, journal processor 180 may manage the journal entries of LU B 156. Specifically, in some embodiments, journal processor 180 may enter write transactions received by the target DPA 124 from the source DPA 112 into the journal by writing them into journal LU 176, read the undo information for the transaction from LU B 156, update the journal entries in journal LU 176 with undo information, apply the journal transactions to LU B 156, and remove already-applied transactions from the journal. In one embodiment, journal processor 180 may perform processing such as described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

Some embodiments of data protection system 100 may be provided as physical systems for the replication of physical LUs, or as virtual systems for the replication of virtual LUs. For example, in one embodiment, a hypervisor may consume LUs and may generate a distributed file system on the logical units such as Virtual Machine File System (VMFS) that may generate files in the file system and expose the files as LUs to the virtual machines (each virtual machine disk is seen as a SCSI device by virtual hosts). In another embodiment, a hypervisor may consume a network based file system and exposes files in the Network File System (NFS) as SCSI devices to virtual hosts.

In some embodiments, in normal operation (sometimes referred to as "production mode"), DPA 112 may act as a source DPA for LU A 136. Thus, protection agent 144 may act as a source protection agent, specifically by splitting I/O requests to host device 140 ("Device A"). In some embodiments, protection agent 144 may send an I/O request to source DPA 112 and, after receiving an acknowledgement from source DPA 112, may send the I/O request to LU A 136. In some embodiments, after receiving an acknowledgement from storage system 108, host 104 may acknowledge that the I/O request has successfully completed.

In some embodiments, when source DPA 112 receives a replicated I/O request from protection agent 144, source DPA 112 may transmit certain I/O information characterizing the write request, packaged as a "write transaction", over WAN 128 to target DPA 124 for journaling and for incorporation within target storage system 120. In some embodiments, when applying write operations to storage system 120, target DPA 124 may act as an initiator, and may send SCSI commands to LU B 156.

In some embodiments, source DPA 112 may send its write transactions to target DPA 124 using a variety of modes of transmission, including (i) a synchronous mode, (ii) an asynchronous mode, and (iii) a snapshot mode.

In some embodiments, in synchronous mode, source DPA 112 may send each write transaction to target DPA 124, may receive back an acknowledgement from the target DPA 124, and in turn may send an acknowledgement back to protection agent 144. In some embodiments, in synchronous mode, protection agent 144 may wait until receipt of such acknowledgement before sending the I/O request to LU 136.

In some embodiments, in asynchronous mode, source DPA 112 may send an acknowledgement to protection agent 144 upon receipt of each I/O request, before receiving an acknowledgement back from target DPA 124.

In some embodiments, in snapshot mode, source DPA 112 may receive several I/O requests and combine them into an aggregate "snapshot" or "batch" of write activity performed in the multiple I/O requests, and may send the snapshot to target DPA 124 for journaling and incorporation in target storage system 120. In some embodiments, in snapshot mode, source DPA 112 may send an acknowledgement to protection agent 144 upon receipt of each I/O request, before receiving an acknowledgement back from target DPA 124.

In some embodiments, in normal operation, LU B 156 may be used as a backup of LU A 136. As such, while data written to LU A 136 by host 104 is replicated from LU A 136 to LU B 156, target host 116 should not send I/O requests to LU B 156. To prevent such I/O requests from being sent, in some embodiments, protection agent 164 may act as a target site protection agent for host device B 160 and may fail I/O requests sent from host 116 to LU B 156 through host device B 160. In some embodiments, in a recovery mode, target DPA 124 may undo the write transactions in journal LU 176 so as to restore the target storage system 120 to an earlier state.

Referring to FIG. 2, in some described embodiments, a write transaction 200 may be included within a journal and stored within a journal LU. In some embodiments, write transaction 200 may include one or more identifiers; a time stamp indicating the date and time at which the transaction was received by the source DPA 112; a write size indicating the size of the data block; a location in the journal LU where the data is entered; a location in the target LU where the data is to be written; and the data itself.

Referring to both FIGS. 1 and 2, in some embodiments, transaction 200 may correspond to a transaction transmitted from source DPA 112 to target DPA 124. In some embodiments, target DPA 124 may record write transaction 200 in the journal that includes four streams. In some embodiments, a first stream, referred to as a "DO" stream, includes a copy of the new data for writing to LU B 156. In some embodiments, a second stream, referred to as a "DO META-DATA" stream, includes metadata for the write transaction, such as an identifier, a date and time, a write size, the offset within LU B 156 where the new data is written, and a pointer to the offset in the DO stream where the corresponding data is located. In some embodiments, a third stream, referred to as an "UNDO" stream, includes a copy of the data being overwritten within LU B 156 (referred to herein as the "old" data). In some embodiments, a fourth stream, referred to as an "UNDO METADATA" stream, includes an identifier, a date and time, a write size, a beginning address in LU B 156 where data was (or will be) overwritten, and a pointer to the offset in the UNDO stream where the corresponding old data is located.

Since the journal contains the "undo" information necessary to rollback storage system 120, in some embodiments, data that was stored in specific memory locations at a specified point in time may be obtained by undoing write transactions that occurred subsequent to such point in time (PIT).

In some embodiments, each of the four streams may hold a plurality of write transaction data. In some embodiments, as write transactions are received dynamically by the target DPA 124, the write transactions may be recorded at the end of the DO stream and the end of the DO METADATA stream, prior to committing the transaction.

In some embodiments, a metadata stream (e.g., UNDO METADATA stream or the DO METADATA stream) and the corresponding data stream (e.g., UNDO stream or DO stream) may be kept in a single stream by interleaving metadata and data.

Some described embodiments may validate that point-in-time (PIT) data replicas (e.g., data replicated to LU B 156) are valid and usable, for example to verify that the data replicas are not corrupt due to a system error or inconsistent due to violation of write order fidelity. In some embodiments, validating data replicas can be important, for example, in data replication systems employing incremental backup where an undetected error in an earlier data replica may lead to corruption of future data replicas.

In conventional systems, validating data replicas can increase the journal lag, which may increase a recovery time objective (RTO) of the data protection system (e.g., an elapsed time between replicas or PITs). In such conventional systems, if the journal lag time is significant, the journal may become full and unable to account for data changes due to subsequent transactions. Further, in such conventional systems, validating data replicas may consume system resources (e.g., processor time, memory, communication link bandwidth, etc.), resulting in reduced performance for system tasks.

Some described embodiments may employ a hash function to track the consistency of data in order to validate data replicas. As will be described, illustrative embodiments may track a hash value of production data at one or more points-in-time and replicate the hash values as metadata to associated replicas when a snapshot is taken (e.g., when a replica is made). Similarly, in some embodiments, when a replica is accessed, the hash value of the replica may be compared to the hash value that was stored as metadata when the replica was generated. In some embodiments, if the hash value of the replica copy is the same as the hash value that was received as metadata, the replica data is consistent with the production data at the PIT the replica was generated. Thus, the replica data is valid and may be relied upon to accurately roll back to the associated PIT.

Figure 3:
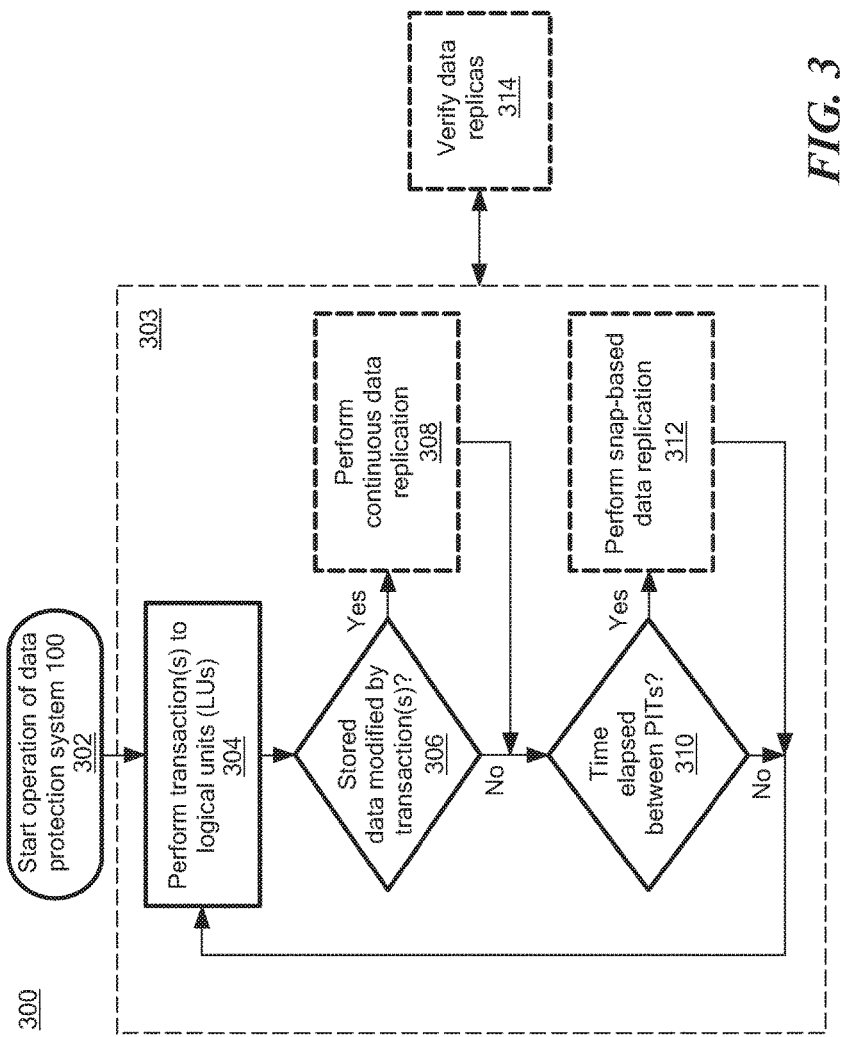
FIG. 3 is a flow diagram of an example of a process to operate the data protection system of FIG. 1, according to an illustrative embodiment of the instant disclosure.

Referring to FIG. 3, a flow diagram of illustrative process 300 for operating data protection system 100 is shown. At block 302, process 300 begins. In some embodiments, at block 304, transactions are performed to write data to and/or read data from storage (e.g., source side storage 108 of FIG. 1), such as described in regard to FIGS. 1 and 2 herein. In some embodiments, at block 306, if stored data would be modified by the transaction (e.g., the transaction is a write operation), some embodiments may optionally perform continuous data replication at block 308. Example embodiments of block 308 may be described in greater detail in regard to FIG. 4. Referring back to FIG. 3, process 300 may proceed to block 310. In some embodiments, if, at block 306, stored data would not be modified by the transaction (e.g., the transaction is a read operation), then at block 310, if a desired time (e.g., based upon the desired RTO of data protection system 100) has elapsed since a PIT associated with a previous replica, then at block 312, some embodiments may optionally perform snap-based data replication. Example embodiments of block 312 may be described in greater detail in regard to FIG. 5. In some embodiments, process 300 may return to block 304 to perform subsequent transactions. In some embodiments, if, at block 310, the desired time has not elapsed, process 300 may return to block 304 to perform subsequent transactions.

In some embodiments, as indicated by dashed line 303, process 300 (e.g., blocks 304, 306, 308, 310 and 312) may be continually performed while data protection system 100 is operable (e.g., powered on). During operation of data protection system 100, some embodiments may optionally verify the data replicas generated at blocks 308 and 312 at block 314. Block 314 is described in greater detail in regard to FIG. 6. In some embodiments, verification of data replicas may be performed periodically at determined time intervals. In some embodiments, verification of data replicas may be performed dynamically during idle time of data protection system 100. In some embodiments, verification of data replicas may be performed as data replicas are generated (e.g., at block 308 or block 312). Further, some embodiments may verify data replicas before employing a given data replica to recover or roll back data of a production site.

Figure 4:
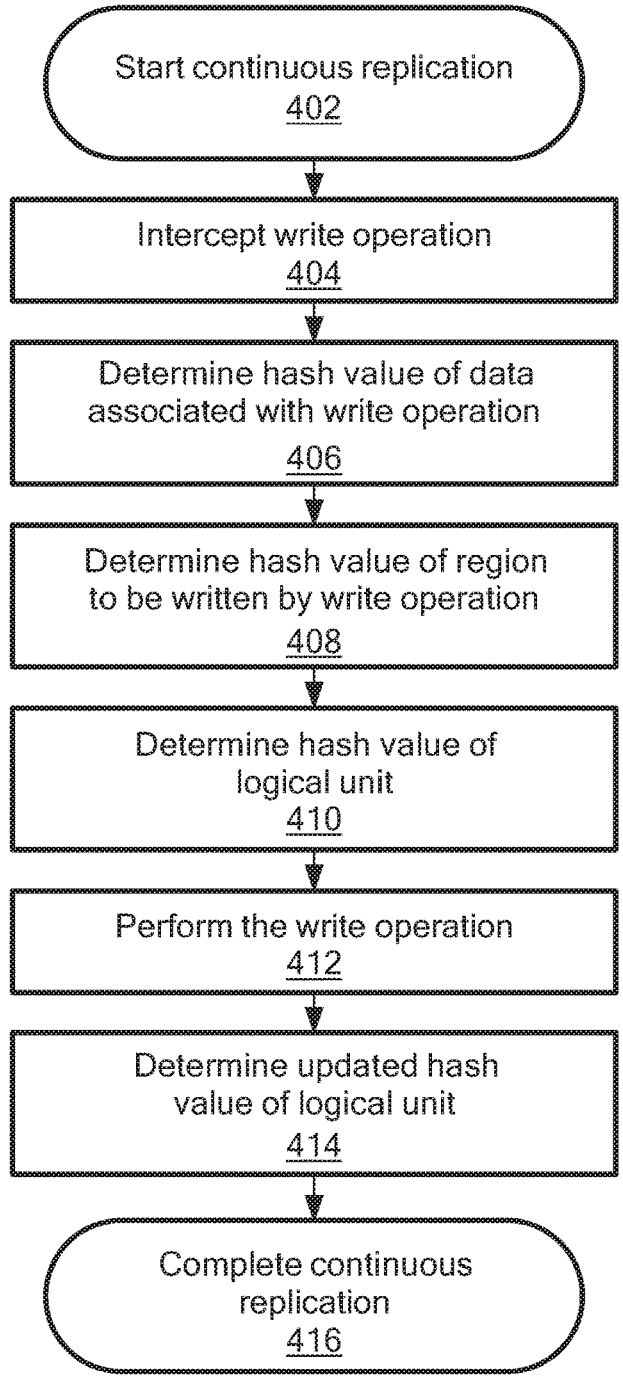
FIG. 4 is a flow diagram of an example of a process to perform continuous data replication by the data protection system of FIG. 1, according to an illustrative embodiment of the instant disclosure.

Referring to FIG. 4, additional detail of block 308 of FIG. 3 for performing continuous replication is shown as illustrative process 308'. For embodiments operating as shown in FIG. 4, process 308' begins at block 402. In some embodiments, at block 404, write operations to one or more logical units (e.g., LU A 136 in the source side storage 108 of FIG. 1) may be intercepted (e.g., by source side protection agent 144) and provided, via switch 148, to source DPA 112, for example as described herein in regard to FIGS. 1 and 2. In some embodiments, at block 406, source DPA 112 may determine a hash value of data associated with the write operation intercepted at block 404. In some embodiments, at block 406, source DPA 112 may also determine a region of an associated LU that would be written by the write operation intercepted at block 404.

In some embodiments, at block 408, source DPA 112 may determine a current hash value of the LU region that would be written. In some embodiments, the current hash value may have been determined during a previous write operation, stored as metadata associated with the logical unit (e.g., as journal data), and retrieved by source DPA 112 at block 408. In some embodiments, the current hash value may be determined at the time of the current write operation at block 408. For example, in some embodiments, source DPA 112 may read the data from the LU[[T]] region that is going to be overwritten by the write operation and calculate the hash value before the write operation is processed. In other embodiments, source DPA 112 may retrieve the hash value of a region, for example by retrieving a previously determined hash value from metadata (e.g., journal data, such as UNDO METADATA) associated with the LU region, without reading data stored in the LU region.

In some embodiments, at block 410, source DPA 112 may determine a current hash value of the logical unit (e.g., the hash value before writing the data associated with the write operation intercepted at block 404). In some embodiments, source DPA 112 may determine the current hash value of the logical unit based upon metadata (e.g., journal data, such as UNDO METADATA) associated with the LU. In some embodiments, at block 412, the write operation may be performed to write the data to the storage (e.g., LU A 136), and a replica may also be written to the target (e.g., LU B 156). In some embodiments, at block 414, source DPA 112 may determine an updated hash value of the logical unit (LU), for example based upon the previous hash value of the logical unit determined at block 410 and the hash value of the write operation determined at block 406. At block 416, process 308' completes.

Figure 5:
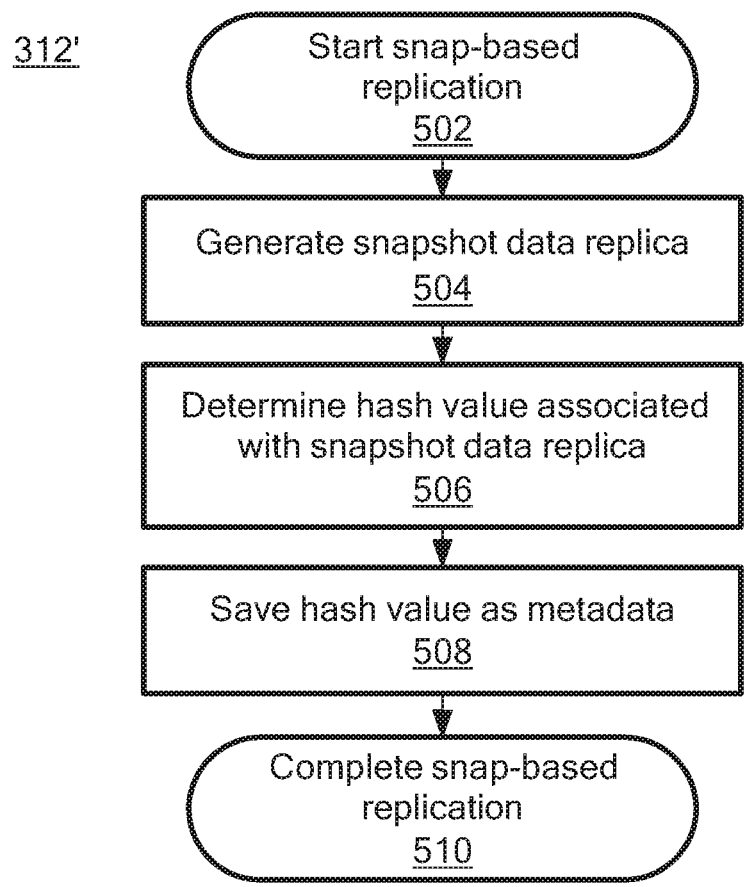
FIG. 5 is a flow diagram of an example of a process to perform snap-based data replication by the data protection system of FIG. 1, according to an illustrative embodiment of the instant disclosure.

Referring to FIG. 5, additional detail of block 312 of FIG. 3 is shown as process 312'. As shown in FIG. 5, process 312' begins at block 502. In some embodiments, at block 504, a snapshot data replica (e.g., a data replica reflecting changes to stored data due to a batch of one or more transactions) may be generated and stored to a target storage (e.g., in LU B 156). In some embodiments, at block 506, the source DPA 112 may determine hash values associated with the generated snapshot data replica. In some embodiments, at block 508, the hash value generated at block 506 may be saved as metadata in a journal associated with the snapshot data replica (e.g., the journal associated with journal processor 180 and journal LU 176 on the target side 100b, when the target side 100b is configured for storing replica information). For example, in an embodiment, the hash value may be stored as journal data, such as UNDO METADATA, associated with the snapshot data replica. At block 510, process 312' completes. In some embodiments, data protection system 100 may also employ the hash values generated at block 506 for other operations, such as data deduplication (e.g., eliminating redundant or repeated copies of data replicas).

In some embodiments, a hash value of a snapshot data replica may be determined based upon a hash value associated a previous snapshot data replica (e.g., the hash value saved in metadata at block 508) and a hash value associated with a data difference between the previous snapshot data replica and a current snapshot data replica.

For example, in some embodiments, the hash function (e.g., as employed in illustrative processes 308' and 312' of FIGS. 4 and 5) may be implemented as a cyclic redundancy check (CRC). A CRC function may beneficially be employed given that a CRC function is adapted to determine incremental changes between large data sets. For example, if data set M is concatenation of data set M1 and data set M2, the CRC value associated with data set M can be determined based upon data set M1 and the CRC value associated with data set M2. Further, the CRC value associated with data set M can be determined based upon the CRC value associated with data set M1 and the CRC value associated with data set M2. Still further, if data set M is a concatenation of data sets M1, M2, and M3, and if data set M' is a concatenation of data sets M1, M2', and M3, and if data set M2' is of the same size as data set M2, then the CRC value associated with data set M' can be determined based upon the CRC value associated with data set M, the CRC value associated with data set M2, and the CRC value associated with data set M2'.

Thus, in embodiments employing CRC, for continuous replication (e.g., FIG. 4), the CRC (e.g., hash value) of a given LU at any given time may be determined based upon the CRC value of the LU region that is going to be overwritten by the write operation, before performing the write operation. Together with the CRC value of the new data to be written (e.g., the data associated with the write operation) and the CRC of the entire LU before the data is written, the CRC value of the entire volume after the write operation is performed can be determined. In embodiments employing journal data, such as described in regard to FIG. 2, CRC values of the entire LU at any given time may be stored with, and thus tracked by, UNDO METADATA.

Figure 6:
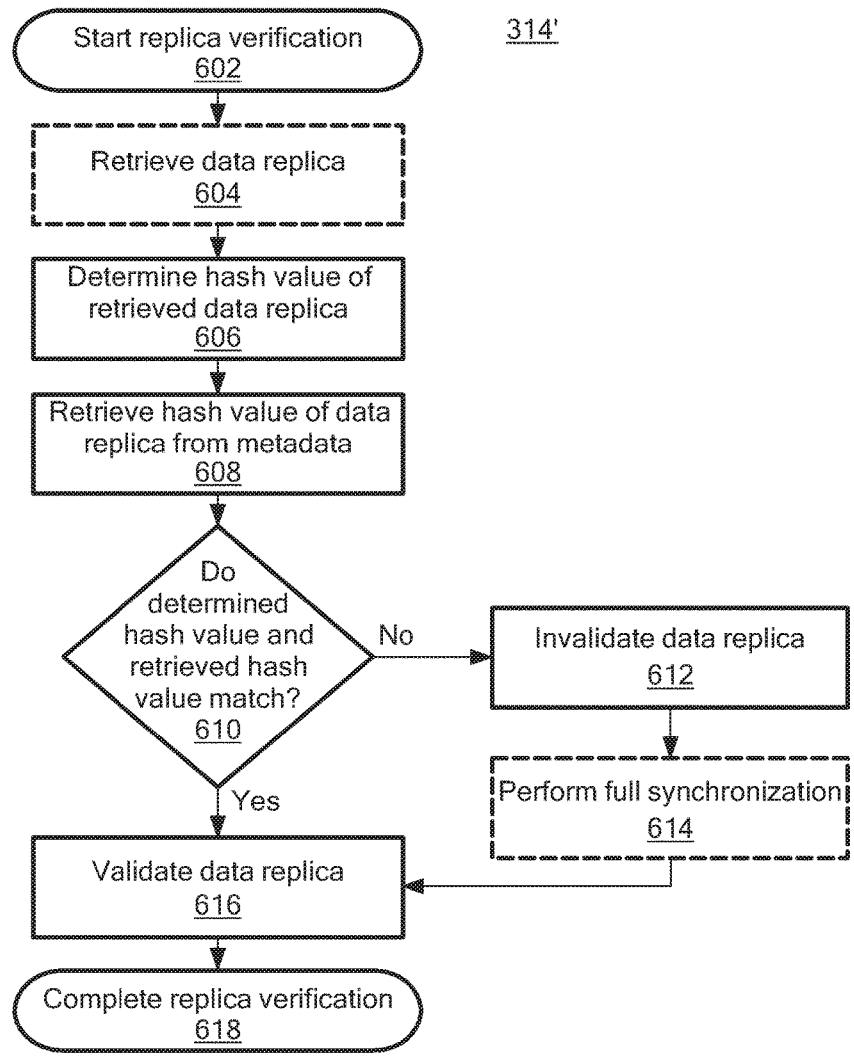
FIG. 6 is a flow diagram of an example of a process to verify data replication validity by the data protection system of FIG. 1, according to an illustrative embodiment of the instant disclosure.

Referring to FIG. 6, additional detail of block 314 of FIG. 3 is shown as process 314'. As described herein, in some embodiments, process 314' may be performed at one or more times during operation of data protection system 100. For example, process 314' may be performed at least one of: (1) periodically at determined time intervals, (2) dynamically during idle time of data protection system 100, (3) as data replicas are generated (e.g., at block 308 or block 312 of FIG. 3), and/or (4) before employing a given data replica to recover or roll back data of a production site.

As shown in FIG. 6, data replica verification process 314' begins at block 602. In some embodiments, at block 604, one or more selected data replicas may optionally be retrieved from storage (e.g., the target DPA 124 may retrieve data replicas from LU B 156, etc.). For example, in some embodiments, a hash value of an entire replica may be determined (e.g., at block 606) by retrieving the replica data. Other embodiments may not retrieve the replica data every time a verification is performed. Rather, some embodiments (e.g., embodiments employing CRC as the hash function) may determine a hash value without retrieving the replica data, for example by determining an updated hash value of the replica based on a hash value of an I/O request to the replica and a hash value of the portion of replica data that is going to be overwritten by the I/O request. Further, at block 604, some embodiments may return a hash value of a specific region of a replica and/or the hash value of the replica, rather than return the replica data itself.

In some embodiments, at block 606, a hash value of each of the retrieved data replicas may be determined (e.g., by performing the hash function on the retrieved data). In some embodiments, at block 608, a hash value associated with each of the retrieved data replicas may be retrieved, for example from journal metadata associated with the data replica (e.g., from associated UNDO METADATA).

In some embodiments, at block 610, the target DPA 124 may determine whether the hash value determined at block 606 matches the hash value retrieved from metadata at block 608. In some embodiments, if, at block 610, the hash values do not match, then, at block 612, the data replica may be invalidated. In some embodiments, if one or more data replicas are invalid, then data protection system 100 may optionally perform a full synchronization of source site storage 108 (e.g., copy the entire data of source storage 108). In some embodiments, process 314' may proceed to block 616 (e.g., to verify the full synchronization copy generated at block 614).

In some embodiments, if, at block 610, the hash values match, then, at block 616, the data replica is validated and process 314' completes at block 618.

As described herein, illustrative embodiments may validate that a data replica is usable by comparing the hash value associated with the data replica to the hash value of the production site when the data replica was generated. For example, if one or more storage devices of the replica storage array (e.g., target storage 120) have failed, or if a data replica was corrupted during retrieval, the hash values would not match at block 610, and the data replica would not be validated. In some embodiments, matches or mismatches in hash values may be quickly detected and may trigger a full synchronization of the production site to increase the reliability of data protection system 100. In some embodiments, quickly detecting hash value mismatches may improve performance of data protection system 100 and ease system troubleshooting and tracking of system consistency.

As described herein, illustrative embodiments may provide systems and processes for verifying data replicas that are "array agnostic," meaning that the validity of the data replicas may be verified across multiple sites and storage arrays. Further, some described embodiments may provide a manner for validating PIT data, even after a roll back, for example by maintaining a hash value of the PIT data as journal metadata. Some embodiments may offer data replica verification such as shown in FIG. 6 as a Platform as a Service (PaaS) to users of data protection system 100.

Figure 7:
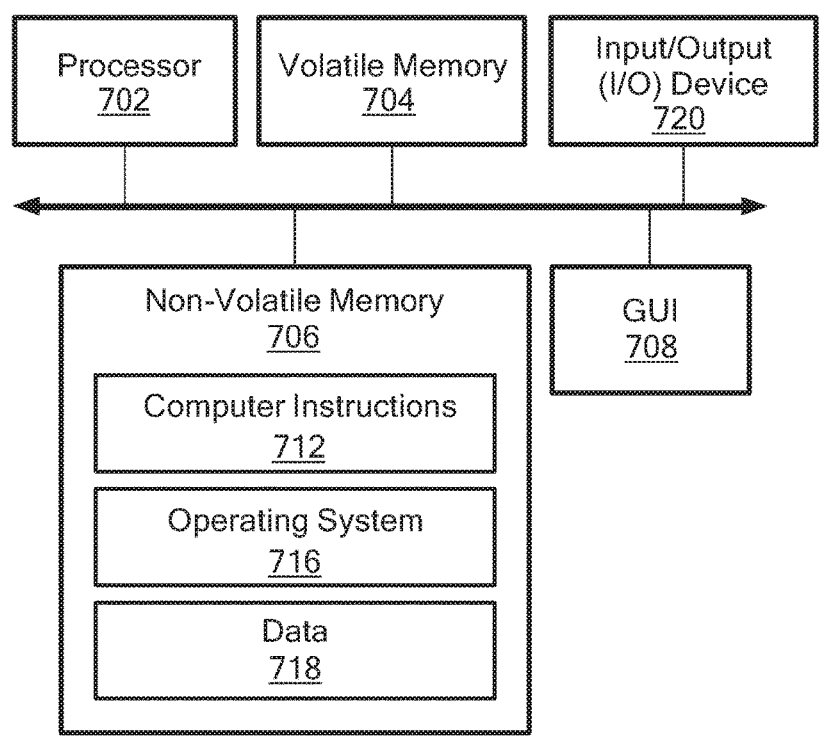
FIG. 7 is a block diagram of an example of a hardware device that may perform at least a portion of the processes in FIGS. 3-6.

In some described embodiments, hosts 104 and 116 of FIG. 1 may each correspond to one computer, a plurality of computers, or a network of distributed computers. For example, in some embodiments, host 104 and/or host 116 may be implemented as one or more computers such as shown in FIG. 7. As shown in FIG. 7, computer 700 may include processor 702, volatile memory 704 (e.g., RAM), non-volatile memory 706 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 708 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704 to perform at least a portion of the processes shown in FIGS. 3-6. Program code may be applied to data entered using an input device of GUI 708 or received from I/O device 720.

Processes 300, 308', 312', and 314' (FIGS. 3-6) are not limited to use with the hardware and software of FIG. 7 and may find applicability in any computing or processing environment and with any type of machine or set of machines that may be capable of running a computer program. Processes 300, 308', 312', and 314' (FIGS. 3-6) may be implemented in hardware, software, or a combination of the two.

The processes described herein are not limited to the specific embodiments described. For example, processes 300, 308', 312', and 314' are not limited to the specific processing order shown in FIGS. 3-6. Rather, any of the blocks of processes 300, 308', 312', and 314' may be re-ordered, combined or removed, performed in parallel or in serial, as necessary, to achieve the results set forth herein.

Processor 702 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in an application specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, a digital signal processor, micro-controller, or general purpose computer. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method operable in a storage system in operable communication with a source subsystem configured to store production data and a target subsystem configured to store one or more replicas of the production data, the method comprising:
   tracking one or more first hash values of the production data of the source subsystem at respective one or more points in time (PIT);
   generating one or more data replicas of the production data at the one or more PIT;
   writing the one or more data replicas, together with the corresponding one or more first hash values, from the source subsystem to the target subsystem,
   storing the one or more data replicas in the target subsystem at a replica storage;
   storing the one or more first hash values, in the target subsystem, as metadata configured as part of target journal data associated with the respective one or more data replicas, wherein the metadata stored for a respective replica generated at a given PIT corresponds to the first hash value of production data taken at the given PIT; and
   verifying each data replica stored in the target subsystem based upon comparing the respective first hash value retrieved from the target journal data with a respective second hash value generated based on the respective data replica stored in the replica storage of the target subsystem, wherein verifying each data replica comprises at least one of:
   periodically verifying the one or more data replicas at determined time intervals;
   dynamically verifying the one or more data replicas during idle time of the storage system; and
   verifying the one or more data replicas before performing a roll back operation employing the one or more data replicas to roll back production data of the storage system.

2. The method of claim 1, wherein generating one or more data replicas comprises at least one of: (i) generating a continuous data replica each time the production data is modified, and (ii) generating a snapshot data replica at a determined time interval.

3. The method of claim 2, wherein generating a continuous data replica comprises:
   intercepting, at the source subsystem of the data protection system, a write operation to the source LU;
   configuring the source subsystem for:
      determining a hash value of data associated with the intercepted write operation;
      determining a pre-write hash value of a region of the source LU to be written by the intercepted write operation; and
      determining a pre-write hash value of the source LU;
   performing the write operation to source LU; and
   determining an updated hash value of the source LU.

4. The method of claim 1, wherein generating at least one of the first hash values and the second hash values comprises generating a cyclic redundancy check (CRC) value.

5. The method of claim 3, wherein determining an updated hash value of the source LU comprises:
   updating the hash value of the source LU based upon the pre-write hash value of the source LU, the hash value of the data associated with the intercepted write operation, and the pre-write hash value of the region of the source LU to be written by the write operation.

6. The method of claim 2, wherein generating a snapshot data replica comprises:
   generating a snapshot data replica at the source subsystem and writing the snapshot data replica to the target subsystem;
   determining a snapshot hash value associated with the snapshot data replica; and
   saving the snapshot hash value associated with the snapshot data replica in the target journal as target journal metadata associated with the snapshot data replica.

7. The method of claim 6, wherein determining a hash value associated with the snapshot data replica comprises:
   determining a hash value associated with a previous snapshot data replica;
   determining a hash value associated with a data difference between the previous snapshot data replica and the snapshot data replica; and
   determining the hash value associated with the snapshot data replica based upon the hash value associated with the previous snapshot data replica and the hash value associated with the data difference.

8. The method of claim 1, wherein verifying at least one of the one or more data replicas further comprises:
   retrieving the at least one data replica from the replica storage in the target subsystem,
   determining a hash value of the at least one retrieved data replica;
   retrieving the hash value associated with the at least one retrieved data replica from the journal metadata in the target journal; and
   comparing the hash value retrieved from the journal data and the determined hash value to verify the at least one retrieved data replica.

9. The method of claim 1 further comprising performing a full synchronization of the production data if the one or more of the data replicas are not verified.

10. The method of claim 1, further comprising providing the verifying of each data replica as a Platform as a Service (PaaS).

11. A system comprising:
   a processor; and memory storing computer program code that when executed on the processor causes the processor to operate a storage system, the storage system in operable communication with a source subsystem configured to store production data and a target subsystem configured to store replicas of the production data, the method operable to perform the operations of:

tracking one or more first hash values of the production data at respective one or more points in time (PIT);

generating one or more data replicas of the production data of the storage system at the one or more PIT;

writing the one or more data replicas, together with the corresponding one or more first hash values, from the source subsystem to the target subsystem;

storing the one or more data replicas in the target subsystem at a replica storage;

storing the one or more first hash values, in the target subsystem as metadata configured as part of target journal data associated with the respective one or more data replicas, wherein the metadata stored for a respective replica generated at a given PIT corresponds to the first hash value of production data taken at the given PIT; and verifying each data replica stored in the target subsystem based upon comparing the respective first hash value retrieved from the target journal data, with a respective second hash value generated based on the respective data replica stored in the replica storage of the target subsystem, wherein verifying each data replica comprises at least one of:

periodically verifying the one or more data replicas at determined time intervals;

dynamically verifying the one or more data replicas during idle time of the storage system; and verifying the one or more data replicas before performing a roll back operation employing the one or more data replicas to roll back production data of the storage system.

12. The system of claim 11, wherein the storage system is further operable to perform at least one of:

generating a continuous data replica each time the production data is modified; and generating a snapshot data replica at a determined time interval.

13. The system of claim 12, wherein for generating a continuous data replica, the storage system if further operable to perform the operation of:

intercepting, at the source subsystem of the data protection system, a write operation to the source LU;

configuring the source subsystem for:

determining a hash value of data associated with the intercepted write operation;

determining a pre-write hash value of a region of the source LU to be written by the intercepted write operation;

determining a pre-write hash value of the source LU;

performing the write operation to the source LU;

determining an updated hash value of the source LU.

14. The system of claim 11, wherein the storage system is further operable to perform the operations of:

generating at least one of the first hash values and the second hash values by generating a cyclic redundancy check (CRC) value; and updating the hash value of the source LU based upon the pre-write hash value of the source LU, the hash value of the data associated with the intercepted write operation, and the pre-write hash value of the region of the source LU to be written by the write operation.

15. The system of claim 12, wherein, for generating a snapshot data replica, the storage system is further operable to perform the operations of:

generating a snapshot data replica at the source subsystem and writing the snapshot data replica to the target subsystem;

determining a snapshot hash value associated with the snapshot data replica;

saving the snapshot hash value associated with the snapshot data replica in the target journal as target journal metadata associated with the snapshot data replica;

retrieving a given data replica from the replica storage in the target subsystem;

determining a hash value of the retrieved data replica;

retrieving the snapshot hash value associated with the snapshot data replica from the target journal metadata; and comparing the snapshot hash value retrieved from the target journal data and the determined hash value of the given data replica to verify the given data replica data replica.

16. A computer program product including a non-transitory computer readable storage medium having computer program code encoded thereon that when executed on a processor of a computer causes the computer to operate a storage system in operable communication with a source subsystem configured to store production data and a target subsystem configured to store replicas of the production data, the computer program product comprising:

computer program code for tracking one or ore first hash values of the production data of the source subsystem at respective one or more points in time (PIT);

computer program code for generating one or more data replicas of the production data of the storage system at the one or more PIT;

computer program code for writing the one or more data replicas, together with the corresponding one or more first hash values, form the source subsystem to the target subsystem;

computer program code for storing the one or more data replicas in the target subsystem at a replica storage;

computer program code for storing the one or more first hash values, in the target subsystem, as metadata configured as part of target journal data associated with the respective one or more data replicas, wherein the metadata stored for a respective replica generated at a given PIT corresponds to the first has value of production data taken at the given PIT; and computer program code for verifying each data replica stored in the target subsystem based upon comparing the respective first hash value retrieved from the target journal data with a respective second hash value generated based on the respective data replica stored in the replica storage of the target subsystem, wherein verifying each data replica comprises at least one of:

periodically verifying the one or more data replicas at determined time intervals;

dynamically verifying the one or more data replicas during idle time of the storage system; and verifying the one or more data replicas before performing a roll back operation employing the one or more data replicas to roll back production data of the storage system.

17. The computer program product of claim 16, wherein the storage system is further operable to perform at least one of:
  generating a continuous data replica each time the production data is modified; and
  generating a snapshot data replica at a determined time interval.

18. The computer program product of claim 17, wherein:
  for generating a continuous data replica, the computer program product further comprises:
    computer program code for intercepting, at the source subsystem of the data protection system a write operation to the source LU;
    computer program code for configuring the source subsystem for:
      determining a hash value of data associated with the intercepted write operation;
      determining a pre-write hash value of a region of the source LU to be written by the intercepted write operation;
      determining a pre-write hash value of the source LU;
    computer program code for performing the write operation to the source LU; and
    computer program code for determining an updated hash value of the source LU; and
  for generating a snapshot data replica, the computer program product further comprises:
    computer program code for determining a snapshot hash value associated with the snapshot data replica;
    computer program code for saving the snapshot hash value associated with the snapshot data replica in the target journal as target journal metadata associated with the snapshot data replica;
    computer program code for retrieving either the snapshot data replica or continuous data replica from the replica storage in the target subsystem;
    computer program code for determining a hash value of the retrieved data replica;
    computer program code for retrieving the hash value associated with the retrieved data replica from the journal metadata in the target journal;
    computer program code for comparing the hash value retrieved from the journal data and the determined hash value to verify the retrieved data replica;
    computer program code for the generating at least one of the first hash values and the second hash values by generating a cyclic redundancy check (CRC) value; and
    computer program code for updating the hash value of source LU based upon the pre-write hash value of the source LU, the hash value of the data associated with the intercepted write operation, and the pre-write hash value of the region of the source logical unit to be written by the write operation.

* * * * *